United States Patent [19]

Bertland

[11] Patent Number: 5,596,573
[45] Date of Patent: Jan. 21, 1997

[54] TRANSFER OF VOICE MESSAGES

[75] Inventor: Staffan Bertland, Täby, Sweden

[73] Assignee: Telefonaktiebolaget LM Ericsson, Stockholm, Sweden

[21] Appl. No.: 361,490

[22] Filed: Dec. 22, 1994

[30] Foreign Application Priority Data

Dec. 22, 1993 [SE] Sweden ................... 9304245

[51] Int. Cl.$^6$ ................... H04L 12/56
[52] U.S. Cl. ................... 370/474; 370/477
[58] Field of Search ................... 370/60, 60.1, 94.1, 370/94.2, 7, 118, 79, 110.1, 85.13, 61; 375/240; 348/384; 455/33.1, 33.2, 33.3; 379/94, 95, 96, 92, 97

[56] References Cited

U.S. PATENT DOCUMENTS

| | | | |
|---|---|---|---|
| 4,951,278 | 8/1990 | Biber et al. | 370/94.1 |
| 5,293,379 | 3/1994 | Carr | 370/118 |

FOREIGN PATENT DOCUMENTS

| | | |
|---|---|---|
| 332818 | 9/1989 | European Pat. Off. . |
| 366342 | 5/1990 | European Pat. Off. . |
| 426269 | 5/1991 | European Pat. Off. . |
| 522772 | 1/1993 | European Pat. Off. . |
| 552051 | 7/1993 | European Pat. Off. . |
| 561026 | 9/1993 | European Pat. Off. . |

*Primary Examiner*—Douglas W. Olms
*Assistant Examiner*—Dang Ton
*Attorney, Agent, or Firm*—Burns, Doane, Swecker & Mathis, L.L.P.

[57] ABSTRACT

A method and a communication network including a public telephone network and a narrow band radio network for packet-switching of data between stationary and mobile terminals. Voice messages may be bi-directionally transferred between the public telephone network and the terminals by a gateway arranged to connect the public telephone network and the packet-switched narrow band radio data network. The voice messages are converted in the gateway or terminals into digital form and compressed, and then transferred to the packet-switched narrow band radio data network. The terminals and the gateway are provided with a device in which the compressed voice messages, transferred through the packet-switched network, are expanded and, after conversion to analog form, reproduced.

14 Claims, 2 Drawing Sheets

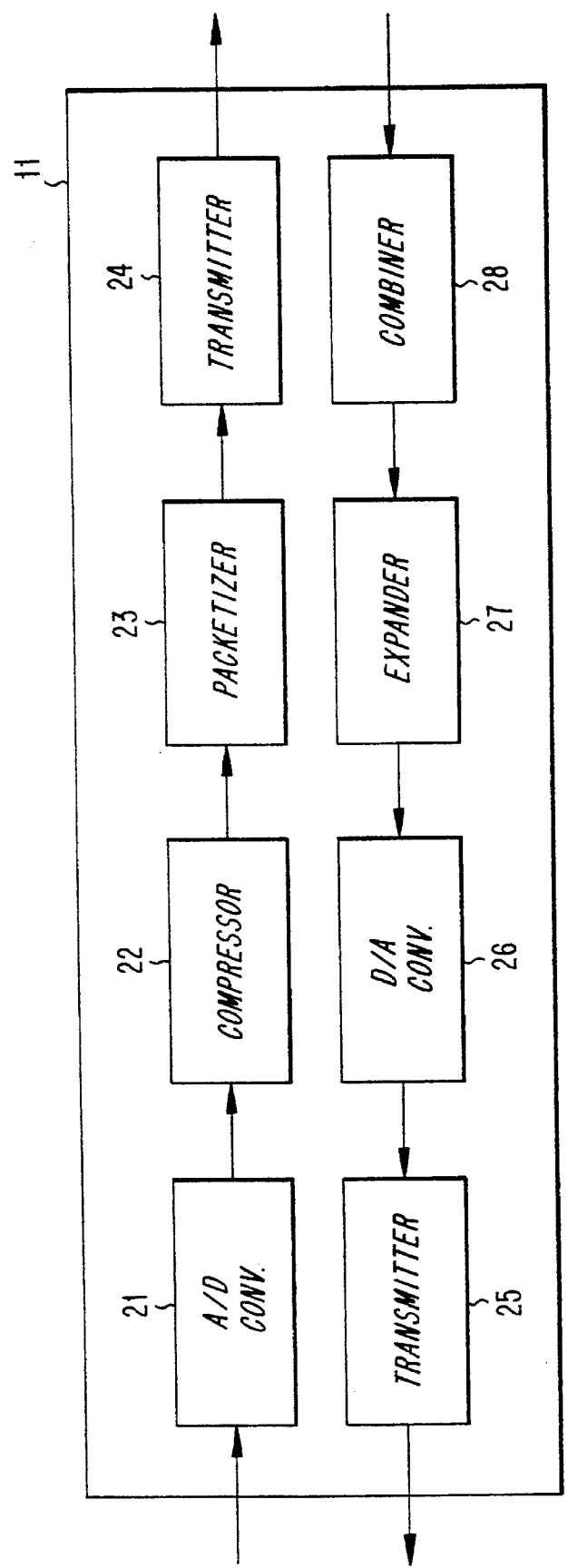

TRANSFER OF VOICE MESSAGES

BACKGROUND

The present invention relates to a method for transferring voice messages.

The present invention also relates to a communication network.

For telecommunications different types of communication networks are utilized, adapted to different usage areas. Existing public telephone networks are mostly intended for transfer of analog, continuous signals while other networks are designed for high speed transfer of digital data signals. Pager systems and radio networks for data transfer to mobile terminals such as MOBITEX® (registered trademark belonging to Televerket) are examples of a type of network that is primarily meant for low speed transfer of digital data.

In mobile telephone systems of the cell type (for example the Nordic NMT, GSM and the like) it is of course possible to transfer voice messages. The transfer in the network is connectivity oriented, which means that a fixed connection route exists for the transfer between the caller and the receiver.

MOBITEX® on the other hand, as with many other data networks, is a packet-switched data network, i.e. a network where data from different sources are brought together in "packets" which are split up after transfer through the network. By means of the packet-switched network, the connections can be used simultaneously by several users with different addresses. It is therefore impossible to transfer voice messages in these networks in real time from, for example, within the network or a public telephone. To send messages, a message that is to be transferred has to be written in at a terminal, after which the message is queued for transfer as a batch in the same manner as other data.

As the access to terminals with connection possibilities to said networks is limited, it is in practice difficult for the public to utilize radio networks such as pager systems and MOBITEX® for transfer of voice messages to and from mobile terminals (which are not usually equipped for voice input and output). If this could be made possible, a new market within telecommunication would be made available.

The object of the present invention is thus to provide a method and a telecommunication network through which it is possible to transfer voice messages primarily bi-directionally in a packet-switched narrow band radio data network between terminals of the packet-switched narrow band radio data network or between a public telephone network and terminals of the packet-switched narrow band radio data network.

SUMMARY

Said object is achieved by means of a method according to the present invention, the characterizing features of which will become apparent from the following description. In one aspect, the invention provides a method of bi-directional transferring voice messages in a communication network having a public telephone network and a packet-switched narrow-band radio data network. The method comprises the steps of converting a voice message from analog form to digital form to create a digitized voice message; compressing the digitized voice message to create a compressed message; and placing the compressed message in at least one data packet. The method further includes the steps of supplementing a data packet with an address of an intended receiver of the voice message and an identification that indicates that the data packet contains a compressed voice message; placing the data packet in a queue for transfer by a packet-switched narrow band radio data network in a batch; and transferring the data packet via the packet-switched narrow-band radio data network in a batch. The method further comprises the steps of combining data packets after transfer to the receiver so that the compressed message is restored; expanding and storing the restored message; and converting the expanded and stored message from digital form to analog form, whereby the voice message is reproduced.

Said object is also achieved by means of a communication network according to the present invention, the characterizing features of which will become apparent from the following description. In one aspect, a communication network, for a public telephone network and a packet-switched narrow-band radio data network for packet-switching of data between stationary and mobile terminals, for bi-directionally transferring voice messages between terminals of the packet-switched narrow-band radio data network and between the public telephone network and terminals of the packet-switched narrow-band radio data network, comprises an inter/ace device for connecting the public telephone network and the packet-switched narrow-band radio data network, and a plurality of terminal.

The interface device comprises means for converting a first voice message received from the public telephone network into a digitized first voice message; means for subsequently compressing the digitized first voice message to create a compressed first voice message; means for placing the compressed first voice message in at least one first data packet; means for transferring first data packets to the packet-switched narrow-band radio data network in a batch; means for combining a second batch of data packets received in a batch from the packet-switched narrow-band radio data network to restore a compressed second voice message; means for subsequently expanding the compressed second voice message to create a digitized second voice message; means for converting the digitized second voice message into an analog second voice message; and means for transferring the analog second voice message to the public telephone network.

Each of the plurality of terminals comprises means for combining a third batch of data packets received in a batch from the packet-switched narrow-band radio data network to restore a compressed third voice message; means for subsequently expanding the compressed third voice message to create a digitized third voice message; means for converting the digitized third voice message into an analog third voice message; means for reproducing the analog third voice message; means for converting a fourth voice message received from an input device into a digitized fourth voice message; means for subsequently compressing the digitized fourth voice message to create a compressed fourth voice message; means for placing the compressed fourth voice message in at least one fourth data packet; and means for transferring fourth data packets to the packet-switched narrow-band radio data network in a batch.

BRIEF DESCRIPTION OF THE DRAWINGS

FIG. 2 shows an exemplary block diagram of a gateway according to the invention.

DETAILED DESCRIPTION

Figure 1:
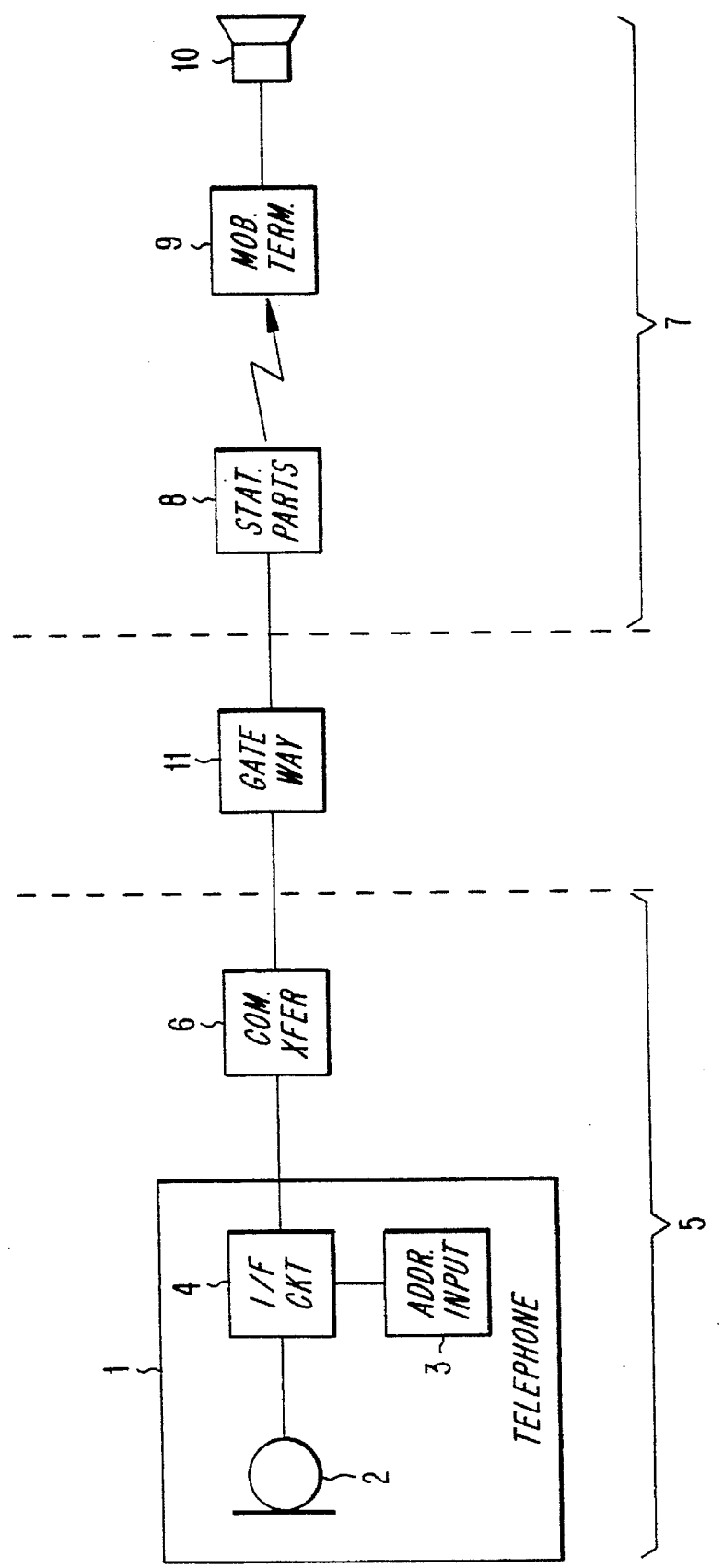
FIG. 1 shows a block diagram of a communication network according to the invention.

The invention shall be described in the following in the form of an example of an embodiment.

The method according to the invention, which makes it possible in a communication network comprising a public telephone network and a packet-switched narrow band radio data network to be able to transfer voice messages, implies that a voice message is converted from analog form to digital form, after which it is compressed;

the compressed message is placed in one, or split into several packets which are subsequently transferred by the packet-switched narrow band radio data network;

the transferred packets are combined so that the compressed message is restored, after which it is expanded;

the expanded message is converted from digital form to analog form, whereby the voice message is recreated.

The compressed voice message can advantageously be supplemented with the address of the receiver of the voice message.

It is also suitable to provide the packets transferred via the packet-switched narrow band radio data network with both an identification that indicates how they should be combined after the transfer, as well as an identification that indicates that the packets contain a voice message.

With reference to FIG. 1, the function of a communication network according to the invention will be described to exemplify the present method.

Reference numeral 1 in the drawing denotes a telephone provided with a microphone 2, a device 3 for providing an address or a number, for example a key set, and interface circuits 4 for adaptation of i.a. the microphone and the key set to the public telephone network 5. The block 6 symbolises the communication transfer parts of the network 5 such as cables, exchanges, and amplifiers etc.

Reference numeral 7 denotes a packet-switched narrow band radio data network that can be a paging system, MOBITEX® or another network of equivalent type. Block 8 comprises the stationary parts of the network in the form of computers for the control of the traffic, stationary terminals, exchanges, data processing functions for, for example packet splitting, radio stations etc. The data is transferred from the radio stations to mobile terminals 9 to which speakers 10 are connected.

Placed "between" the two networks 5 and 7 is a significant part for the invention, i.e. the gateway 11, shown in FIG. 2. This unit converts a message received from the public telephone network to a format that is adapted to the packet-switched narrow band radio data network and it also converts a message received from the packet-switched narrow band radio data network to a format that is acceptable by the public telephone network. The physical placement of the gateway can vary—technically it can belong to any one of the networks without influencing the function of the device.

When a voice message is to be transferred from the telephone 1 to the mobile terminal 9, the transfer is made by means of the caller calling the gateway 11. When this connection is established, the caller is notified that a message can be received. With the key set 3 the caller then submits the address ("number") of the mobile terminal and with the help of the microphone 2 the voice message is submitted to the gateway.

In the gateway the voice message is converted to digital form 21, after which it is compressed 22 according to known methods. As an example, hybrid coders can be used, as presented in the book "Discrete Time Processing of Speech Signals" by J. Deller which is incorporated here by reference. With these known methods it is by way of example possible to compress a 10 second long voice message to 3 kbyte data. The gateway 11 has also received the address given by key set 3 to the mobile terminal from the telephone network 5. This address is submitted together with the compressed message 23 to the packet-switched narrow band radio data network 24. Depending on the demands of this network, the address can be transmitted separately from the compressed message or aggregated with it.

In the stationary parts 8 of the packet-switched narrow band radio data network 7, the compressed message and the address are processed in the same manner as data from terminals of its own network. The message will consequently be transferred as one or several packets through the packet-switched narrow band radio data network to the mobile terminal 9 to which the address refers. For transfer the current protocol of the system is applied, which means for MOBITEX® its protocol MTP/1 (Mobitex Transport Protocol) can be used.

The packets are thus provided with identifications adapted to the valid protocol that indicate both in which order they should be combined after the transfer, as well as that the packets contain compressed voice messages. The identifications that indicate that a packet contains compressed voice messages can thus be placed within a packet defined by the protocol or in the header that precedes the packets. In the terminal the packets are identified as containing compressed voice messages, after which the compressed message is restored by joining the packets in the correct order.

In the terminal 9 there are also means that expand the compressed message. The expansion also utilises known methods (see for example the earlier mentioned book by J. Deller). The message is consequently converted to an analog signal that corresponds to the original voice message and it can, for example, be reproduced with the loudspeaker 10.

In the above-described device the invention has been used for transfer of voice messages from a telephone in a public telephone network to a mobile terminal in a packet-switched narrow band radio data network. Many of the packet-switched radio networks are however meant for traffic in both directions. The invention is used in such networks for two-way communication by means of supplementing the terminals with a microphone and means for analog-digital conversion and for compression. In a corresponding manner, the gateway has also to be provided with means for expansion 27, combining 28, and digital-analog conversion 26 and transmitter 28.

As the terminals in a two-way network are equipped to be able to transfer voice messages in both directions, then voice, messages can of course also be exchanged between two terminals.

It can of course arise that the receiver is not available (the terminal is not operational) when the voice message is to be transferred. In certain networks there exists the possibility to temporarily store messages for later transfer. The compressed message can in these cases be stored in the gateway at the same time as information that indicate that a message can be collected is stored in the radio network traffic controlling computers. When the mobile terminal is once more operational, the information that a message is available in the gateway is transferred to the terminal. Assuming that the terminal is meant for two-way communication, the user of the terminal can consequently connect himself with the gateway and collect the message. As an alternative, the complete message can be transferred directly when the terminal is switched on. In certain applications the transfer of the message can be repeated a number of times, possibly until the reception is acknowledged from the terminal.

The mobile terminals are often used in situations where the user can end up in distress situations, such as accidents, assault threats etc. In such cases, the invention can be used to transfer voice messages to receivers that are not normally equipped with terminals, for example police stations. The messages and/or the address (number) to the receiver can also be stored pre-programmed in the terminal or gateway so that alarms can easily be activated with a single release means.

It is also possible by means of the invention to transfer voice group messages in a packet-switched narrow band radio data network, which means a certain voice message can be tranfered to all terminals or smaller selected groups. An example of the latter is voice traffic messages that are only transferred to the terminals that are in the affected area.

The invention has thus made it possible to reach data terminals with voice messages from a telephone connected to a public telephone network and from other data terminals, independantly of where the caller and the receiver are located.

The invention is not limited to the described embodiments, but may be varied freely within the scope of the appended claims.

What is claimed is:

1. A method of bi-directional transferring voice messages in a communication network having a public telephone network and a batch type packet-switched narrow-band radio data network for transferring voice messages in both directions between the public telephone network and terminals of the packet-switched narrow-band radio data network and for transferring voice messages in both directions between terminals of the packet-switched narrow-band radio data network, the method comprising the steps of:

converting an entire voice message from analog form to digital form to create a digitized voice message;

compressing the digitized voice message to create a compressed message;

placing the compressed message in at least one data packet;

supplementing a data packet with an address of an intended receiver of the voice message and an identification that indicates that the data packet contains a compressed voice message;

placing the data packet in a queue for transfer by the packet-switched narrow band radio data network in a batch;

transferring the data packet via the packet-switched narrow-band radio data network in a batch;

combining data packets after transfer to the receiver so that the compressed message is reassembled;

expanding and storing the reassembled message; and converting the expanded and reassembled message from digital form to analog form, whereby the voice message is reproduced.

2. The method of claim 1, wherein the receiver is alerted that a voice message is received and available.

3. The method of claim 1, wherein data packets transferred via the packet-switched narrow-band radio data network include an identification that indicates how the data packets should be reassembled after the transfer.

4. The method of claim 3, wherein voice message transfer is effected between terminals of the packet-switched narrow-band radio data network.

5. A communication network, for a public telephone network and a batch type packet-switched narrow-band radio data network for packet-switching of data between stationary and mobile terminals, for bi-directionally transferring voice messages between terminals of the packet-switched narrow-band radio data network and between the public telephone network and terminals of the packet-switched narrow-band radio data network, comprising:

interfacing means for connecting the public telephone network and the packet-switched narrow-band radio data network, wherein the interfacing means comprises:

means for converting an entire first voice message received from the public telephone network into a digitized first voice message;

means for subsequently compressing the digitized first voice message to create a compressed first voice message;

means for placing the compressed first voice message in at least one first data packet;

means for transferring first data packets to the packet-switched narrow-band radio data network in a first batch;

means for combining a second batch of data packets received in a batch from the packet-switched narrow-band radio data network to reassemble a compressed second voice message;

means for subsequently expanding the compressed second voice message to create a digitized second voice message;

means for convening the digitized second voice message into an analog second voice message; and means for transferring the analog second voice message to the public telephone network; and a plurality of terminals, each terminal comprising:

means for combining the first or second batch of data packets received in a batch from the packet-switched narrow-band radio data network to restore a compressed first or second voice message;

means for subsequently expanding the compressed first or second voice message to create a digitized first or second voice message;

means for converting the digitized first or second voice message into an analog first or second voice message;

means for converting a second voice message received from an input device: into a digitized second voice message;

means for subsequently compressing the digitized second voice message to create a compressed second voice message;

means for placing the compressed second voice message in at least one second data packet; and means for transferring second data packets to the packet-switched narrow-band radio data network in a second batch.

6. The communication network of claim 5, wherein the interfacing means is arranged to receive and forward an address, indicated from the public telephone network, of the terminal that is to receive the voice message.

7. The communication network of claim 6, wherein the interfacing means supplements the compressed first voice message with the address of the receiving terminal.

8. The communication network of claim 7, wherein the data packets transferred in the packet-switched narrow-band radio data network are provided with identifications that indicate that the data packets contain compressed voice messages.

9. The communication network of claim 8, wherein the data packets transferred in the packet-switched narrow-band radio data network are provided with identifications that indicate how the packets should be reassembled in one of the terminals and the interfacing means for recreation of the compressed message.

10. The communication network of claim 5, wherein the interfacing means further comprises means for storing voice messages that are not immediately transferrable to the terminals or the public telephone network.

11. The communication network of claim 10, wherein the packet-switched narrow-band radio network comprises means for supplying information to the terminals that indicates a voice message is stored.

12. The communication network of claim 11, wherein a terminal includes means for sending a request for transfer of a stored message to the interface means.

13. The communication network of claim 10, wherein the packet-switched narrow-band radio data network includes means for repeatedly supplying compressed messages to a terminal.

14. The communication network of claim 10, wherein the packet-switched narrow-band radio network includes means for repeatedly supplying compressed messages to a terminal until reception of the compressed messages is acknowledged.

* * * * *

UNITED STATES PATENT AND TRADEMARK OFFICE
CERTIFICATE OF CORRECTION

PATENT NO. : 5,596,573

DATED : Jan. 21, 1997

INVENTOR(S) : Bertland

It is certified that error appears in the above-identified patent and that said Letters Patent is hereby corrected as shown below:

Column 2, line 24, please change "inter/ace" to --interface--.

Column 4, line 51, after "voice" please delete ",".

Column 6, line 28, please change "convening" to --converting--; and line 44, after "device" please delete ":".

Signed and Sealed this

Twenty-fourth Day of June, 1997

*Attest:*

BRUCE LEHMAN

*Attesting Officer*      *Commissioner of Patents and Trademarks*